United States Patent
Del-Fabbro et al.

(10) Patent No.: US 10,632,949 B2
(45) Date of Patent: Apr. 28, 2020

(54) METHOD OF ASSISTANCE TO AT LEAST ONE OCCUPANT OF AN ACCIDENT AFFECTED VEHICLE AND DEDICATED ASSISTANCE SYSTEM

(71) Applicant: RENAULT s.a.s., Boulogne Billancourt (FR)

(72) Inventors: Laetitia Del-Fabbro, Montigny le Bretonneux (FR); Denis Darmouni, Meudon-la-Foret (FR); Claire Petit-Boulanger, Guyancourt (FR)

(73) Assignee: RENAULT s.a.s., Boulogne Billancourt (FR)

( * ) Notice: Subject to any disclaimer, the term of this patent is extended or adjusted under 35 U.S.C. 154(b) by 120 days.

(21) Appl. No.: 15/532,897

(22) PCT Filed: Nov. 12, 2015

(86) PCT No.: PCT/FR2015/053056
§ 371 (c)(1),
(2) Date: Jun. 2, 2017

(87) PCT Pub. No.: WO2016/087734
PCT Pub. Date: Jun. 9, 2016

(65) Prior Publication Data
US 2017/0361795 A1 Dec. 21, 2017

(30) Foreign Application Priority Data
Dec. 2, 2014 (FR) ...................................... 14 61781

(51) Int. Cl.
*B60R 21/00* (2006.01)
*G07C 5/08* (2006.01)
(Continued)

(52) U.S. Cl.
CPC .............. *B60R 21/00* (2013.01); *B60R 16/02* (2013.01); *G07C 5/008* (2013.01); *G07C 5/08* (2013.01);
(Continued)

(58) Field of Classification Search
CPC .......... B60R 21/00; B60R 16/02; G07C 5/008
See application file for complete search history.

(56) References Cited

U.S. PATENT DOCUMENTS 9,071,957 B2 * 6/2015 Stadtlander ............. H04W 4/90
9,633,549 B2 * 4/2017 Lyman ................. G08B 25/016
(Continued)

FOREIGN PATENT DOCUMENTS

DE 10 2004 016191 A1 9/2005
DE 10 2011 000277 A1 7/2012

OTHER PUBLICATIONS

International Search Report dated Feb. 12, 2016 in PCT/FR2015/053056 filed Nov. 12, 2015.
(Continued)

Primary Examiner — Ramsey Refai
(74) Attorney, Agent, or Firm — Oblon, McClelland, Maier & Neustadt, L.L.P.

(57) ABSTRACT

A method of assistance to at least one occupant of a vehicle involved in an accident includes detecting a state of the vehicle resulting from the accident, activating a device to measure a physiological state of the occupant, collecting physiological data relating to the occupant by at least one dedicated measurement device, recording the data collected, and sending a message containing the data relating to the physiological state of the occupant to a remote data storage server, via a telematic control unit on board the vehicle. The collecting the physiological data is carried out recurrently at a regular time interval from a time of the detecting the state
(Continued)

Figure 1:
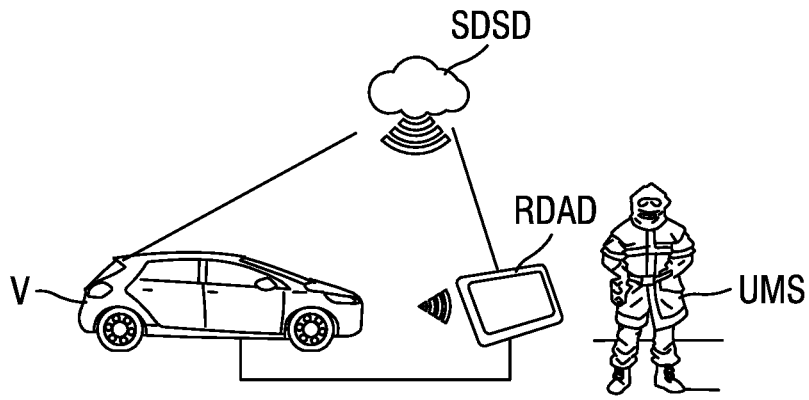

of the vehicle resulting from the accident. The sending the message is carried out automatically after each of the recording of the data collected in the collecting.

14 Claims, 5 Drawing Sheets

(51) Int. Cl.
    *B60R 16/02* (2006.01)
    *G07C 5/00* (2006.01)
    *B60W 40/08* (2012.01)
(52) U.S. Cl.
    CPC .............. *B60R 2021/0027* (2013.01); *B60W 2040/0872* (2013.01)

(56) References Cited

U.S. PATENT DOCUMENTS

| | | | | |
|---|---|---|---|---|
| 2008/0085696 | A1* | 4/2008 | Salahshour | G08B 25/08 455/404.1 |
| 2010/0222687 | A1* | 9/2010 | Thijs | A61B 5/02438 600/508 |
| 2011/0054786 | A1* | 3/2011 | Kim | G01C 21/3641 701/533 |
| 2013/0070043 | A1* | 3/2013 | Geva | B60K 28/066 348/14.02 |
| 2013/0338851 | A1 | 12/2013 | Lynch et al. | |
| 2013/0345921 | A1* | 12/2013 | Al-Ali | G05D 1/0055 701/23 |
| 2014/0002651 | A1* | 1/2014 | Plante | H04N 5/76 348/148 |
| 2014/0104405 | A1* | 4/2014 | Weidl | A61B 5/02416 348/77 |
| 2014/0306826 | A1* | 10/2014 | Ricci | H04W 4/21 340/573.1 |
| 2017/0274906 | A1* | 9/2017 | Hassan | B60K 28/14 |

OTHER PUBLICATIONS

French Search Report dated Jul. 1, 2015 in FR 1461781 filed Dec. 2, 2014.

* cited by examiner

METHOD OF ASSISTANCE TO AT LEAST ONE OCCUPANT OF AN ACCIDENT AFFECTED VEHICLE AND DEDICATED ASSISTANCE SYSTEM

The present invention relates in a general manner to the automotive field, and more specifically relates to a method of assistance to at least one occupant of a vehicle, especially in the context of an emergency service after an accident.

For most emergency services deployed after a vehicle accident, mobile rescue units ascertain the severity of an accident and the physiological state of each of the occupants of a vehicle only once they are present at the accident site. Often, however, knowledge of how their physiological state is changing is essential to precisely diagnose the nature of the first aid which should be provided to them.

Some manufacturers provide communications systems on board vehicles, enabling communication to be autonomously established with first aid call centers so that the geo-tracking coordinates of the vehicle involved in an accident can be transmitted, for example. Sending the geo-tracking data relating to the vehicle over a given area thus makes it possible for mobile rescue units to be dispatched more rapidly to the accident site.

It is also known that, in parallel with this data communication, telephone communication can also be established between a victim of the accident and a dedicated emergency call center. This call is useful for confirming the actual situation of the accident, and also for communicating the severity of the accident and the state of health of the occupants.

Despite such systems, the accident victim or witness is not always in a position to provide reliable information on his or her physiological state, nor even that of the other passengers in the vehicle involved in the accident.

This data is nonetheless essential from the point of view of professionals in order to analyze the severity of the accident. Despite existing improved systems being deployed, first aid teams ascertain the actual situation of the accident and also the physiological state of each of the occupants of the vehicle only at a late stage, and only when they physically arrive at the actual accident site.

The length of time between the vehicle accident and arrival of the first response teams at the actual accident sites is important, however, because the state of health of each user changes rapidly, all the more rapidly the greater the severity of the accident.

One of the aims of the invention is to solve at least some of the abovementioned drawbacks by providing a method and a system of assistance to at least one occupant of a vehicle involved in an accident who is capable of communicating at least the physiological state of each occupant of the vehicle, and possibly data relating to the vehicle involved in the accident.

The term "physiological state of an occupant" is understood as meaning the data which is at least representative of the heart rate and respiratory rate of the occupant.

To this end, the subject matter of the invention relates to a method of assistance to at least one occupant of a vehicle involved in an accident, comprising a detection step for detecting a state of the vehicle resulting from the accident, an activation step for activating the means for measuring the physiological state of the occupant, a collection step for collecting the physiological data relating to the occupant by at least one dedicated measurement device, a recording step for recording the data collected, a sending step for sending a message containing the data relating to the physiological state of the occupant to a remote data storage server, via a telematic control unit on board the vehicle.

It should be noted that in this application the term "remote" applied to a server means that the server is located at a distance from the vehicle.

By virtue of the invention, the method of assistance to at least one occupant of a vehicle involved in an accident and the associated system make it possible to concomitantly create a communication relating to the accident situation and a communication relating to the physiological change in at least one of the occupants of the vehicle destined for at least one mobile first response unit which will be dispatched to the accident site. By using a system that is capable of implementing the method which is a subject of the invention, the mobile first aid unit is also able to anticipate and prioritize the aid which should be provided to the occupants of the vehicle involved in the accident according to the change in their respective physiological states.

Unlike the systems of the prior art, according to the invention the physiological state of each of the occupants is a vital piece of data which is advantageously evaluated by monitoring the static state of health or the state of health changing over time.

According to an advantageous feature of the assistance method of the invention, the collection step for collecting the physiological data is carried out recurrently at regular time intervals from the time of detecting a state of the vehicle resulting from the accident and over a predetermined time period, which corresponds approximately to the average response time for first response teams to arrive at the accident sites.

By way of example, the recurrence takes place every 10 seconds over a time period of 30 minutes.

The means used in this way to monitor the physiological state of each of the occupants are thus used only when a vehicle state resulting from an accident is in progress.

According to the assistance method of the invention, the sending step for sending a message is carried out automatically after each recording of the data measured in the step for automatically collecting the physiological data. Communication thus takes place in a sequenced manner over time in such a way that it significantly reduces the required energy consumption.

According to another feature of the assistance method according to the invention, the detection step for detecting a state of the vehicle resulting from the accident consists of identifying the triggered state of at least one airbag or of identifying a value, from the instantaneous measurement by a decelerometer on board the vehicle, which is greater than a predetermined threshold value. The occupant is not obliged to manually issue a distress signal. The vehicle functions in a completely autonomous manner in the sense that it acts in accordance with the state of certain items of safety equipment which are on board the vehicle, such as the airbags or the decelerometer connected to an electronic control unit, the latter being capable of transposing the force of the impact into a signal to control triggering of the airbags.

According to an advantageous feature of the assistance method according to the invention, the latter comprises a collection step for collecting data relating to the vehicle carried out concomitantly with the collection step for collecting the physiological data relating to the occupant. This allows important information which will then be used by the first aiders, since the response of the first aiders is adapted according to the data measured on the vehicle.

According to another feature of the assistance method, the data relating to the state of the vehicle are the geo-tracking coordinates and/or the instantaneous speed of displacement of the vehicle, measured over a predetermined time period preceding the accident, and/or the identification of the vehicle and/or the intensity of the impact and/or the state of each of the airbags. This data enables a mobile rescue unit to anticipate the nature of the first aid to be provided before they arrive at the accident site. Such data advantageously makes it possible to evaluate the effect of the impact of the accident and to anticipate the trauma to which the occupants of the vehicle are subjected.

According to a feature of the assistance method, the remote data storage server is capable of receiving manufacturer data regarding features relating to the vehicle involved in the accident. By ascertaining the identification of the vehicle involved in the accident, the remote data storage server is thus able to interrogate a database of data from the manufacturers in order to obtain information to help in decision-making, such as for example the procedure for vehicle extrication or disabling components which might present a danger, such as a gas supply, the nature of the refrigerant fluid in the air conditioning system, for example, and also the different messages making it possible to shut down the on-board actuators.

According to a further advantageous feature of the assistance method, the latter comprises a preliminary identification step for identifying the occupant, which consists in particular of an identification request comprising a collection step for collecting the cardiac signature of the occupant by at least one dedicated measurement device, a step for recording in a memory of the vehicle, in such a way that the vehicle is capable of individually and personally recognizing each of the occupants of the vehicle through his or her own cardiac signature.

Advantageously, the assistance method also comprises an authorization step enabling the remote data storage server to access an individual electronic medical file relating to the occupant identified. The mobile rescue units can thus adapt their medical diagnoses according to the medical history.

Notably, the assistance method also comprises an establishment step for establishing an information communication path between the remote data storage server and a graphical interface intended to be used by a mobile rescue unit, a sending step for sending the data in the remote data storage server to the graphical interface in such a way as to allow monitoring of the change in the physiological state of each of the occupants of the vehicle involved in the accident. The graphical interface is in particular capable of receiving and using all of the data collected then communicated by the remote data storage server. Such a communication is preferably established according to a communication protocol which is normally used in telecommunications networks.

Finally, the assistance method of the invention may advantageously comprise an establishment step for establishing remote communication between the graphical interface and the vehicle, a sending step for sending, from the graphical interface to the telemetric control unit of the vehicle, a message for controlling an electrical actuator, a transmission step for transmitting the message between the telematic control unit and the electronic control unit connected to the actuator in question. The actuator may be an airbag, in such a way that operation thereof, which has been deemed unstable by the mobile rescue unit, can be inhibited by forcing it to shut down. The mobile rescue unit which is often confronted with unstable states of airbags can thus, according to each case, control shutdown of any airbag which was not triggered during the impact. The risk of an untriggered airbag being unintentionally triggered after the accident is therefore considerably reduced.

The invention also relates to a system of assistance to at least one occupant of a vehicle involved in an accident, which comprises means for implementing the abovementioned assistance method, said means comprising:
- at least one sensor for measuring the physiological state of at least one of the occupants of a vehicle;
- a telematic control unit on board the vehicle communicating with said sensor;
- a remote data storage server equipped with at least one computer and a data transmitter/receiver intended to receive data sent by a telematic control unit on board the vehicle and/or by at least one external database containing the data relating to the vehicle involved in the accident and/or to the individual electronic medical file of an occupant identified; and
- a graphical interface comprising at least one computer and a data transmitter/receiver capable of communicating with the remote data storage server in order to allow monitoring of the change in the physiological state of at least one occupant of the vehicle.

Said graphical interface comprising at least one computer and a data transmitter/receiver may also be able to communicate with the telematic control unit on board the vehicle in order to deactivate at least one actuator controlled by this unit.

Figure 2:
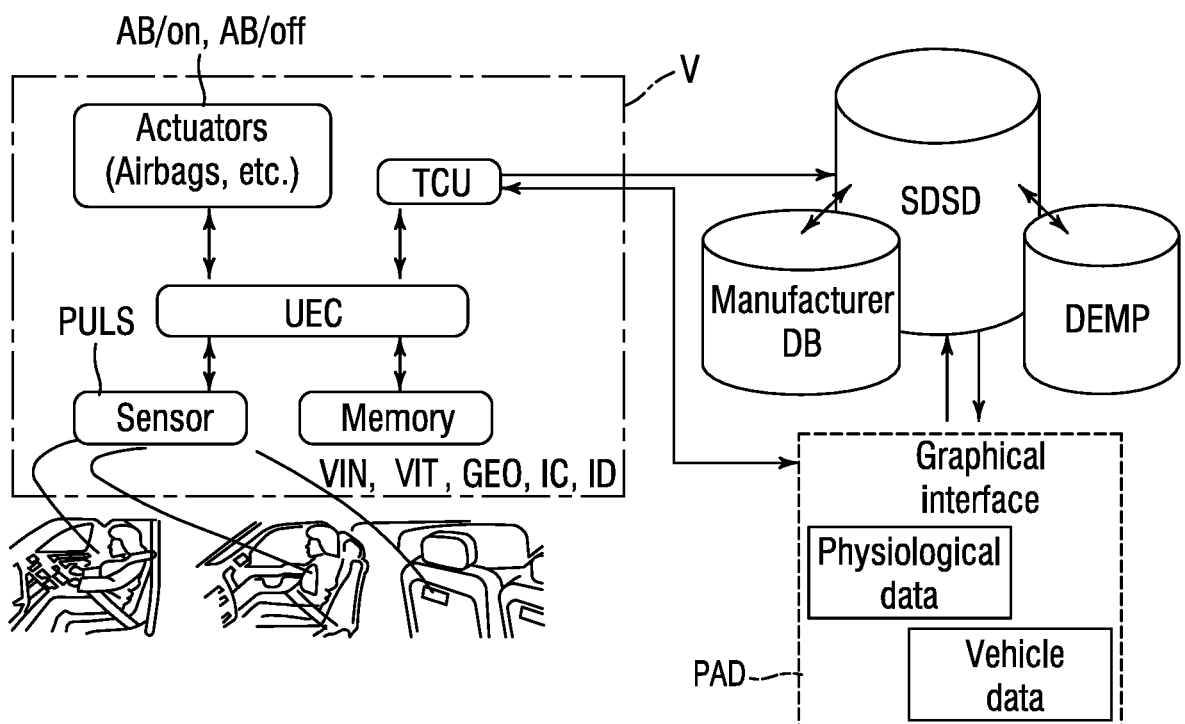
Figure 3:
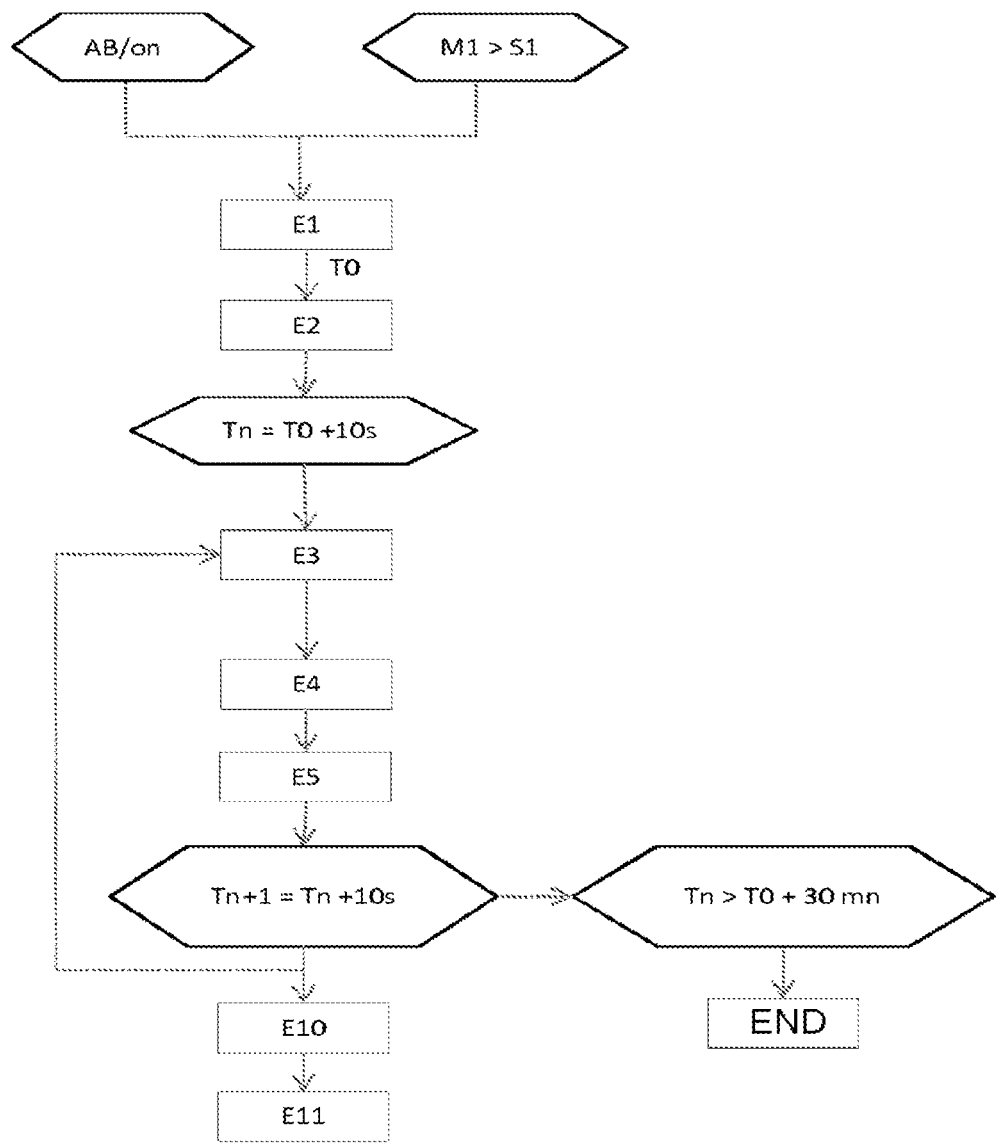
Figure 4:
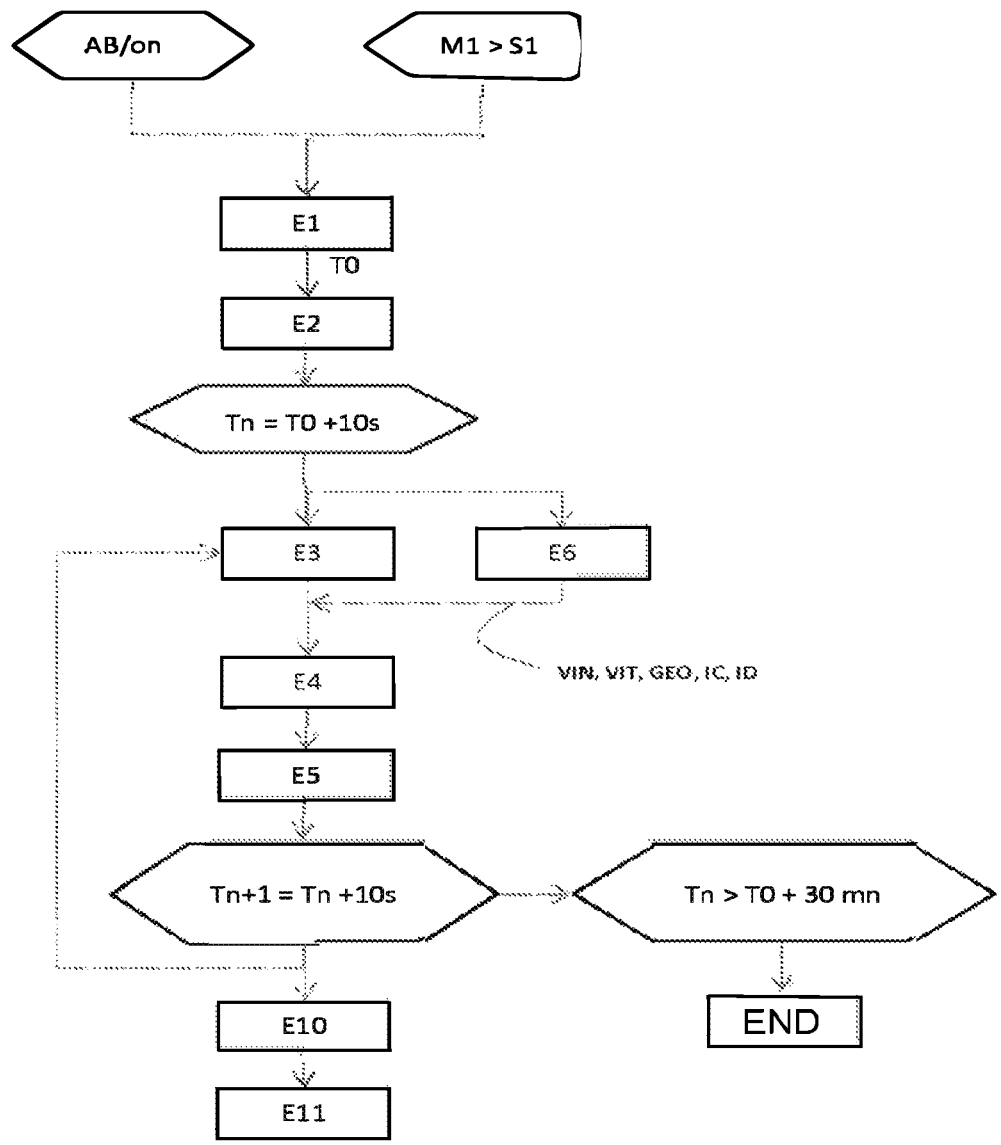
Figure 5:
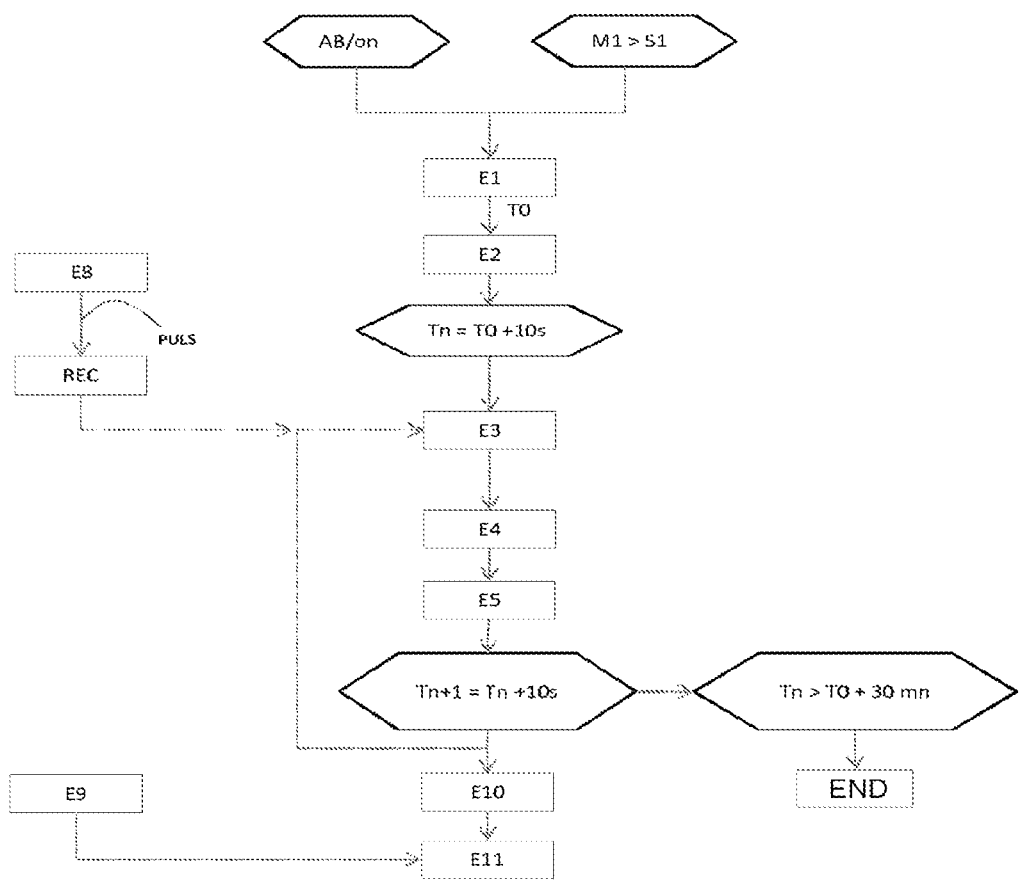
Figure 6:
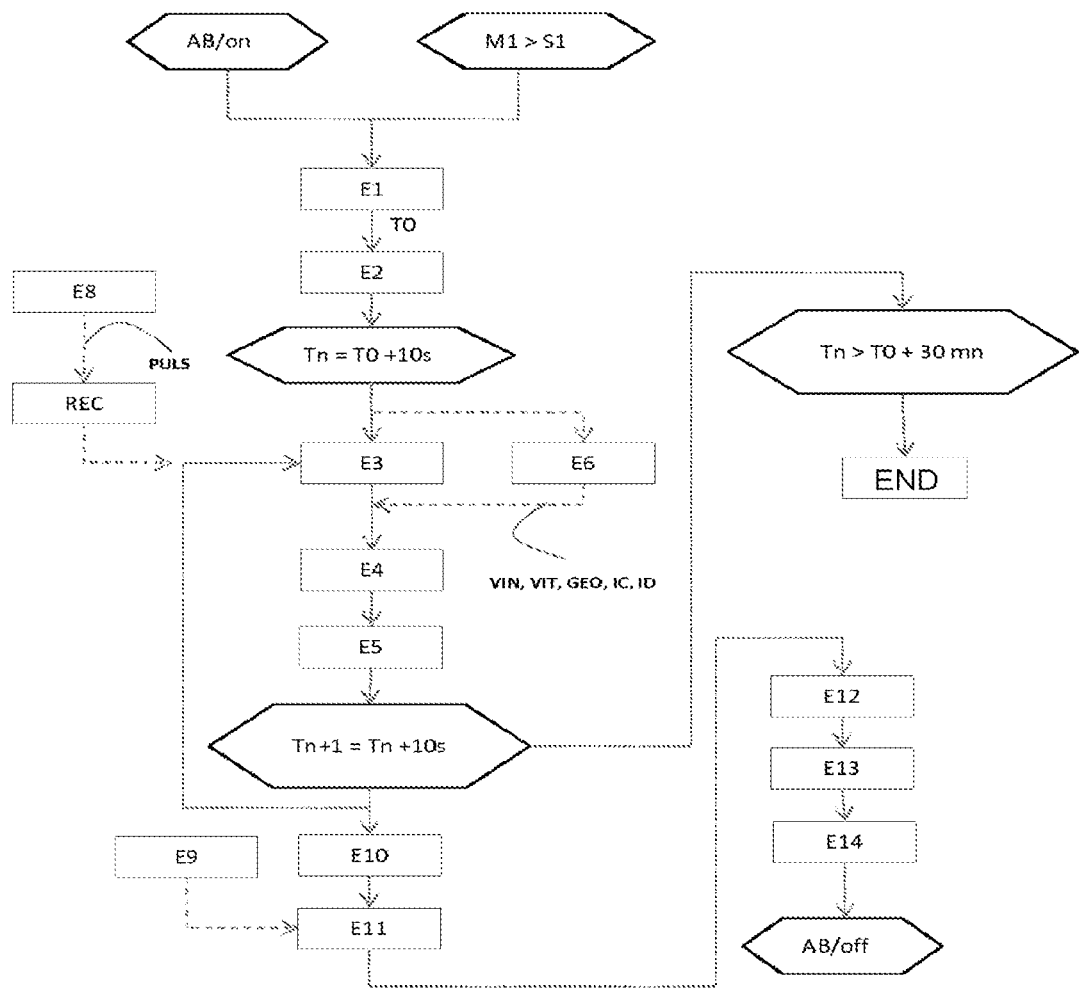

Other features and advantages will become apparent on reading a preferred mode of embodiment described with reference to the figures in which:

FIG. 1 shows a diagram of the principle of a system enabling implementation of the method of assistance to an occupant of a vehicle involved in an accident, according to the invention, in a preferred mode of embodiment, FIG. 2 schematically shows the different functional elements of the system in FIG. 1, in a preferred mode of embodiment, FIG. 3 shows an operating algorithm of the method of assistance to an occupant of a vehicle involved in an accident, according to the invention, and FIGS. 4 to 6 show different variants of the algorithm in FIG. 3, according to the invention.

According to a preferred mode of embodiment of the invention shown in FIG. 1, the system enabling implementation of the method of assistance to at least one occupant of a vehicle involved in an accident comprises a vehicle V communicating with a remote server SDSD via a known telecommunication protocol which uses a telecommunication network of 3G or 4G type, for example. For this purpose, the vehicle may comprise an on-board system known under the English acronym TCU to designate a Telematic Control Unit. Such a system is advantageously capable of communicating data measured by sensors present in the vehicle.

By way of example, such sensors may in particular be dedicated to measuring the cardiac rhythm of each occupant of the vehicle and may be disposed in the vehicle compartment, by incorporation into the seat or seatbelt, by way of example. Such sensors preferably remain in a standby state in order to reduce energy consumption. In order to make the sensors operational, they must be activated in advance, as will be described later. The sensors may further be combined with image-capture means, such as at least one on-board camera the specific role of which is to film the inside of the vehicle compartment.

The remote server SDSD is preferably capable of processing the data sent by the TCU with the aim of arranging same. To this end, it comprises a dedicated computer. The server may be connected to a reception module enabling such data communication. The data received and processed in this way is then sent to a graphical interface PAD which allows a trained person to read the data communicated by the remote server SDSD. Such communication to the graphical interface PAD is preferably carried out by way of a communication protocol using a network suited to movement of the equipment, as is the case for a network of the 3G or 4G type, by way of nonlimiting example.

Given the particular nature of the data communicated by the remote server SDSD, said graphical interface PAD is intended to be handled by a person who is preferably part of a mobile rescue unit UMS, one of the first functions of which is to bring assistance to a victim of a road accident, especially an occupant of a vehicle involved in an accident, and who is qualified to analyze and interpret the data made visible on the graphical interface PAD.

Such a graphical interface PAD is noteworthy in that it further enables monitoring of information relating to the physiological state of the occupants of the vehicle involved in the accident before the mobile rescue unit UMS has arrived at the actual accident sites.

Such a graphical interface PAD is noteworthy in that it enables monitoring of the physiological state of the occupants of a vehicle by virtue of successive iterations of sending the data relating to said occupants.

As shown in greater detail in FIG. 2, the vehicle V may comprise an electronic control unit UEC which is electrically connected to safety devices which may be airbags or seatbelts, for example, in order to enable communication of their physical state, namely whether the airbags are deployed or undeployed. Such a UEC is noteworthy in that it can identify a malfunction of an airbag resulting for example from an undeployed state despite the deployment instruction generated because of the impact.

The UEC may equally be interfaced with the TCU and also with a recording unit such as an internal memory which is able to store, in a sliding manner, the different measured values of the operating parameters of the vehicle during the accident, such as for example the geographical location "GEO" or the instantaneous speed "VIT" of displacement of the vehicle.

The identification of the vehicle "VIN" may also be stored in the UEC.

Communication between the UEC and the TCU enables communication of the data specific to the vehicle to the remote server SDSD.

By way of example, by virtue of the vehicle identification data, the remote server SDSD is able to send a request in order to interrogate a data storage server containing the technical data relating for example to the methods for extracting the occupants according to the vehicle body type, to the nature of the energy used for operation of the powertrain and the dangers thereof. Such technical data is preferably received by the remote server SDSD with a view to transmission to the graphical interface PAD with the aim of communicating with the mobile rescue unit UMS.

Alternatively, other data may equally be obtained by the remote server SDSD, which may equally be in communication with a database in which may be stored individual electronic medical files DEMP in terms of their association with patients.

The assistance system according to the invention may thus, concomitantly with sending of data relating to the physiological state of an occupant, inform the user via the graphical interface PAD as to the medical history of an occupant of the vehicle involved in the accident, electronically edited in the form of an individual electronic medical file DEMP. By virtue of this information, the mobile rescue unit UMS is capable of providing assistance of a nature that has never been achieved up until now because the individual electronic medical file DEMP of the occupant prior to his or her accident is taken into account.

Such information communication must of course be controlled via a security system allowing only limited access because of the highly confidential content of this type of information. To this end, the security system may receive an authorization relating to dissemination of the recorded medical information.

The use of such a system advantageously enables implementation of the method of assistance to at least one occupant of a vehicle involved in an accident which comprises the steps of the algorithm in FIG. 3.

Since the system functions autonomously, one of the first steps consists of a detection step E1 for detecting the accident situation. The system may include detection of a triggered airbag—step AB/on—or detection of deceleration greater than a predetermined threshold value—step M1>S1—taken separately or in combination. The triggered state of the airbag is information known to the UEC for controlling triggering of an airbag, which is connected to a deceleration sensor. This same sensor is capable of sending an instantaneous deceleration value which may be compared with a predetermined threshold value in such a way as to enable the UEC to have an image of an accident situation of the vehicle at a time T0.

Following the step E1, the method comprises an activation step E2 for activating the means for measuring the physiological state of the occupant. Each of the means for measuring the physiological state incorporated into the vehicle compartment is shifted from a standby mode to an active operational mode in which said means is able to take a measurement of the physiological state of at least one occupant. By way of example, in the case where said measurement means are at least one sensor incorporated into each seatbelt or into the seat, such a sensor is capable of measuring the heartbeat or the respiratory rate, or possibly the heartbeat and the respiratory rate, of at least one occupant. Given that other types of sensor may equally be used, such as for example a thermal camera or simply a video camera, the latter is then shifted into an active operational mode in order to proceed with collecting the physiological data relating to the occupant.

According to the method of the invention, there then follows a collection step E3 for effectively collecting the data relating to the physiological state of the occupant over a specific time period, in this case a period of 10 seconds, by way of nonlimiting example.

Thus when the condition Tn=T0+10 s is confirmed, there then follows a recording step E4 for recording the data in the UEC then a sending step E5 for sending a message containing the data to the remote data storage server SDSD, via the telematic control unit TCU, which uses a conventional communication path of the 3G or 4G type.

Advantageously, the data messages are sent in a repetitive manner, preferably every 10 seconds, and successively over a predetermined time period, according to an average period of time taken by a mobile first response unit in order to physically arrive at the accident sites after the first alert signal received. By way of nonlimiting example, such a predetermined value is half an hour in this case. The vehicle therefore sends a message destined for the remote data storage server SDSD every 10 seconds. After each sending, the steps E3, E4 and E5 are carried out again.

After the remote data storage server SDSD has received a message in accordance with the step E5, the SDSD has to inform the mobile first aid units UMS thereof. To this end, the method of the invention comprises a step E10 which consists of an establishment step E10 for establishing an information communication path between the remote data storage server SDSD and the graphical interface PAD intended to be used by a mobile rescue unit UMS.

Once the communication link has been established, the SDSD transfers the data to the PAD. This step E11 allows the mobile rescue unit to be informed of changes in the physiological states of the occupants of the vehicle.

According to other variant embodiments of the method which is a subject of the invention, it is possible to add other information especially required by the UMS.

The variants of the assistance method which is a subject of the invention are described hereinafter. The assistance method may comprise at least one of these variants taken separately or in combination.

According to one variant, as illustrated by the algorithm in FIG. 4, the method duplicates the steps of the method in FIG. 3 except that it comprises an additional collection step E6 for collecting data relating to the vehicle which is carried out concomitantly with the collection step E3 for collecting the physiological data. Given that this vehicle data does not vary over time, the step E6 is preferably carried out only once, simultaneously with the step E3 which consists of the first collection of the physiological state of the occupant.

The data relating to the vehicle is thus preferentially communicated to the SDSD when the first message is communicated.

Preferentially, and in a completely nonlimiting manner, the data relating to the vehicle taken separately or in combination are the geo-tracking coordinates GEO, the instantaneous speed VIT of displacement of the vehicle, measured over a predetermined time period preceding the accident and sometimes indicated by the impact speed, or the identification of the vehicle VIN. Given that the UEC measures the impact speed VIT, the former determines the intensity of the impact IC in accordance with a prerecorded calculation rule. Such a data item may be useful to the mobile rescue units UMS in order to anticipate diagnosis of the bodily trauma inflicted on the vehicle occupant during the accident, before the UMS arrives at the accident site.

According to another variant of the assistance method shown by the algorithm in FIG. 5, the method duplicates the steps of the method in FIG. 3 except that it may comprise an identification phase ID for identifying the occupant. Based on the well-known assumption stating that each individual has his or her own cardiac identity, the sensor for measuring the physiological state is a noteworthy tool in that it can be of use in this identification. Specifically, in an initial phase of use of the vehicle, prior to use of the vehicle causing the accident situation, any occupant may be identified via his or her own cardiac signature. Such an identification step may take place by way of a voluntary measurement of the heartbeat which may take place during a recording step REC for recording each user of the vehicle. Such an identification step may be enabled by activating the dedicated sensor in order to obtain an identification of the cardiac signature PULS which is then recorded in the memory of the vehicle to which the TCU has access via the UEC.

By virtue of this cardiac signature, the SDSD which may be in communication with a medical database in which a large number of individual electronic medical files DEMP are archived, with the aim of communicating the content of the latter to the mobile rescue unit UMS subsequently to the occupant being identified via his or her cardiac signature. In order to make such a transmission of highly confidential data operational, the method may comprise an authorization step E9 granted to the SDSD for the purpose of accessing the individual electronic medical file DEMP. The sending step E11 for sending the data from the remote data storage server SDSD to the graphical interface PAD may thus contain additional data, such as the content of the individual electronic medical file DEMP.

According to a variant, as shown by the algorithm in FIG. 6, the method duplicates the steps of the method in FIG. 3 which are shown by solid lines, except that it comprises a succession of additional steps E12 to E14 the aim of which is to allow communication between the PAD in transmitter mode in order to disable operation of a vehicle actuator, which may be an airbag by way of nonlimiting example. In addition to the possibility offered by the TCU of sending data messages to the SDSD, the TCU is equally able to receive data sent by the PAD via a communication protocol of the Bluetooth® type, for example. The advantage of such a communication is to allow communication between the transmitter incorporated into the PAD and the receiver of the TCU in the vehicle.

This advantageously enables a command intended to provide safety for the members of a mobile rescue unit UMS. An established situation of danger exists for example when an airbag has not been triggered despite the triggering order given by the UEC. Extricating an occupant from a vehicle involved in an accident may then turn out to be dangerous for a member of the mobile rescue unit.

The use of the PAD as a means of communication with the vehicle allows the electrical actuators such as an airbag to be remotely controlled via the TCU. It then becomes possible to cancel the triggering order, which leads to forcing the airbags into a shutdown operating mode, thus making intervention by the mobile rescue unit safe.

In this way, when the mobile rescue unit UMS is dispatched to the accident site, the graphical interface PAD is used in an establishment step E12 for establishing remote communication with the vehicle, especially with the telemetric control unit TCU, via the Bluetooth® communication protocol. Once the PAD has been matched with the TCU, a sending step E13 is carried out to send a message for controlling an electrical actuator from the graphical interface PAD to the telemetric control unit TCU. The data relating to the vehicle in question originates from the data storage server of the manufacturer, which has already been communicated in the step E10.

There then follows a transmission step E14 for transmitting the message to control shutdown of an airbag, for example, via the TCU and the UEC to which said airbag in question is electronically connected. It thus becomes possible to force the shutdown of an airbag which is in an operating state deemed unstable by the members of the mobile rescue unit UMS.

Alternatively, the PAD may control any other type of actuator included in the vehicle, such as for example and in a nonlimiting manner the turn signals, unlocking of the doors, control of opening and closing of the vehicle windows, and possibly stopping of the engine.

The algorithm in FIG. 6 may equally comprise the step E6 or the set of the steps E8 and REC, or the step E9, taken separately or in combination, such steps having been previously described with reference to FIGS. 4 and 5. Given the optional nature of the steps E6, E8, REC and E9 in the assistance method, the algorithm in FIG. 6 shows the steps E6, E8, REC and E9 in chain-dotted lines.

It should be noted that modes of embodiment of the system for implementing the assistance method according to the invention and of the assistance method according to the invention other than those described above may also be envisioned. In particular, the steps E1 to E14 are not all essential for carrying out the invention, and some of these steps or the manner in which they are ordered may be carried out differently.

The invention claimed is:

1. A method of assistance to at least one occupant of a vehicle involved in an accident, the method comprising:
   detecting a state of the vehicle resulting from the accident;
   activating a camera or a sensor to measure a physiological state of the occupant;
   collecting physiological data relating to the occupant by at least one dedicated measurement device;
   recording the physiological data collected; and
   sending a message containing the physiological data relating to the physiological state of the occupant to a remote data storage server, via a telematic control unit on board the vehicle, wherein
   the collecting of the physiological data is carried out recurrently at a regular time interval from a time of the detecting of the state of the vehicle resulting from the accident, and
   the sending of the message to the remote data storage server is carried out repetitively for a predetermined period of time after the accident has occurred and automatically after each of the recording of the physiological data collected in the collecting, the predetermined period of time corresponds to an average time taken by a mobile first response unit to arrive at a site of an accident.

2. The method as claimed in claim 1, wherein the detecting of the state of the vehicle resulting from the accident includes identifying a triggered state of at least one airbag or of identifying a value, from an instantaneous measurement by a decelerometer on board the vehicle, which is greater than a predetermined threshold value.

3. The method as claimed in claim 1, further comprising collecting data relating to a state of the vehicle carried out concomitantly with the collecting the physiological data relating to the occupant.

4. The method as claimed in claim 3, wherein the data relating to the state of the vehicle are geo-tracking coordinates and/or an instantaneous speed of displacement of the vehicle, measured over a predetermined time period preceding the accident, and/or an identification of the vehicle and/or an intensity of an impact and/or a state of each of airbags.

5. The method as claimed in claim 4, wherein the remote data storage server is configured to receive manufacturer data regarding features relating to the vehicle involved in the accident.

6. The method as claimed in claim 1, further comprising identifying the occupant, which includes an identification request comprising collecting a cardiac signature of the occupant by at least one dedicated measurement device, and recording in a memory of the vehicle.

7. The method as claimed in claim 6, further comprising enabling the remote data storage server to access an individual electronic medical file relating to the occupant identified.

8. The method as claimed in claim 1, further comprising establishing an information communication path between the remote data storage server and a graphical interface to be used by the mobile rescue unit, and sending the data in the remote data storage server to the graphical interface in such a way as to allow monitoring of a change in the physiological state of each of the occupants of the vehicle involved in the accident.

9. A system of assistance to at least one occupant of a vehicle involved in an accident, the system comprising:
   processing circuitry configured to
      detect a state of the vehicle resulting from the accident,
      activate at least one sensor to measure the physiological state of the occupant of the vehicle,
      collect physiological data relating to the occupant at a regular time interval from a time of detecting the state of the vehicle resulting from the accident, and
      send a message containing the physiological data relating to the physiological state of the occupant, sending of the message being carried out repetitively for a predetermined period of time after the accident has occurred and automatically after collecting the physiological data, the predetermined period of time corresponding to an average time taken by a mobile first response unit to arrive at a site of an accident;
   a remote data storage server equipped with at least one computer and a data transmitter/receiver configured to receive data sent by a telematic control unit on board the vehicle that communicates with the at least one sensor and/or by at least one external database containing the data relating to the vehicle involved in the accident and/or to the individual electronic medical file of an occupant identified; and
   a graphical interface comprising at least one computer and a data transmitter/receiver configured to communicate with the remote data storage server in order to allow monitoring of a change in the physiological state of at least one occupant of the vehicle.

10. An apparatus comprising:
    processing circuitry configured to
       detect a state of a vehicle resulting from an accident;
       activate a camera or a sensor to measure a physiological state of an occupant of the vehicle;
       collect physiological data relating to the occupant, and
       control sending of a message containing the physiological data relating to the physiological state of the occupant to a remote data storage server, wherein
    collecting of the physiological data is carried out recurrently at a regular time interval from a time of detecting the state of the vehicle resulting from the accident, and
    controlling sending of the message to the remote data storage server is carried out repetitively for a predetermined period of time after the accident has occurred and automatically after each collecting of the physiological data, the predetermined period of time corresponding to an average time taken by a mobile first response unit to arrive at a site of an accident.

11. The method as claimed in claim 1, wherein the detecting of the state of the vehicle resulting from the accident includes identifying a triggered state of at least one airbag.

12. The method as claimed in claim 1, wherein the sending of the message is carried out repetitively every ten seconds, and for the predetermined period of time that is thirty minutes.

13. The method as claimed in claim 1, further comprising collecting data relating to a state of the vehicle including geo-tracking coordinates, an instantaneous speed of displacement of the vehicle, measured over a predetermined time period preceding the accident, an identification of the vehicle, an intensity of an impact, and a state of each of airbags, the collecting being carried out concomitantly with the collecting the physiological data relating to the occupant.

14. The method as claimed in claim 1, wherein the activating of the camera or the sensor to measure the physiological state of the occupant, the collecting of the physiological data relating to the occupant, the recording of the physiological data collected, and the sending of the message containing the physiological data are all performed after the accident has occurred.

* * * * *